United States Patent [19]

Juy, deceased

[11] 4,161,124

[45] Jul. 17, 1979

[54] APPARATUS FOR THE CONTROL BY A CABLE OF SPEED CHANGE DEVICES OF ARTICULATED PARALLELOGRAM TYPE FOR BICYCLES AND SIMILAR VEHICLES

[75] Inventor: Lucien C. H. Juy, deceased, late of Dijon, France, by Henri Juy, heir

[73] Assignee: Le Simplex, Dijon, France

[21] Appl. No.: 780,993

[22] Filed: Mar. 24, 1977

[30] Foreign Application Priority Data

Mar. 24, 1976 [FR] France .................. 76 09406

[51] Int. Cl.² .......................... F16H 7/10; F16H 9/00; F16H 11/08
[52] U.S. Cl. .................................. 74/217 B; 74/242.3
[58] Field of Search ...................... 74/242.15 B, 217 B

[56] References Cited

U.S. PATENT DOCUMENTS

| | | | |
|---|---|---|---|
| 3,394,604 | 7/1968 | Kimura | 74/217 B |
| 3,994,167 | 11/1976 | Juy | 74/217 B |
| 4,061,048 | 12/1977 | Huret et al. | 74/242.15 B |

Primary Examiner—Leonard H. Gerin
Attorney, Agent, or Firm—Haseltine, Lake & Waters

[57] ABSTRACT

Apparatus for the control by a cable of a speed change device comprising an articulated parallelogram including a fixed upper support, a laterally movable lower support and two parallel levers pivotably connected to the supports. A chain guide is secured to the lower support and is laterally movable therewith for derailing a chain on pinions of a free wheel cluster. The parallelogram is subject to an elastic member which deforms the parallelogram in one direction, the cable acting on the parallelogram to deform it in the other direction against the action of the elastic member. The sheath of the cable is secured to the upper support of the parallelogram and the cable itself is secured to the lower support of the parallelogram such that application of external force to the cable produces deformation of the parallelogram. The upper support has a projection which can be integral therewith or attached thereto for carrying the sheath stop and disposing the same in an offset position laterally in the direction of the free wheel cluster and vertically in the direction of the lower support. The projection can have a groove in which the cable is received.

11 Claims, 12 Drawing Figures

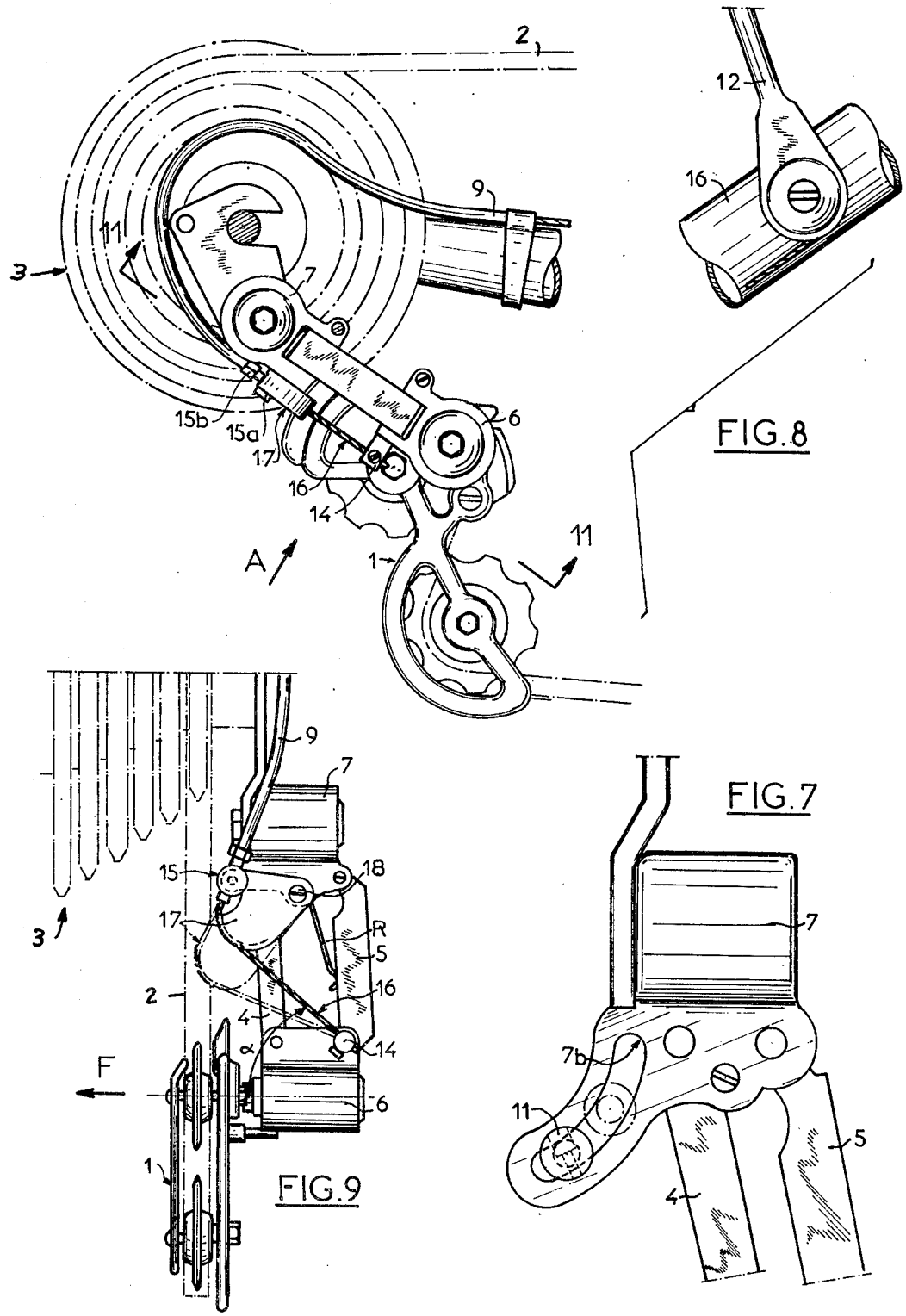

APPARATUS FOR THE CONTROL BY A CABLE OF SPEED CHANGE DEVICES OF ARTICULATED PARALLELOGRAM TYPE FOR BICYCLES AND SIMILAR VEHICLES

FIELD OF THE INVENTION

The invention relates to an apparatus for the control by means of a cable of speed change devices of the articulated parallelogram type for bicycles and similar vehicles.

The invention relates more particularly to the speed change devices which derail a chain for cycles and similar vehicles.

PRIOR ART

In a known speed change device of the type having an articulated parallelogram, as illustrated by way of example in FIG. 1 of the drawing, a chain guide 1 which derails a chain 2 on (FIGS. 9 and 10) pinions 3 of the free wheel cluster is transversely displaced by the deformations of an articulated parallelogram constituted by levers 4, 5, pivoted on a lower support 6 carrying a system of rollers and also on an upper support 7 fixed to the bicycle. The control of the deformations of the articulated parallelogram is effected generally by a system having a cable 8 mounted at least partially in sheath 9. The cable is stressed or relaxed by acting on a control lever 12 to which the cable is secured. In one direction of control, normally to pass the chain on the pinions of increasing diameter, one or more elastic means R acting on the articulated parallelogram are placed under pressure. In the other direction, the elastic means acts by return action to move the chain on the pinions of decreasing diameter.

The sheath 9 fixes the travel of the cable in order to effect the force of the control, at least in the path of the cable from the frame up to the speed change device. The extremity of the sheath 9 is supported in a sheath stop 10 mounted at a fixed point on the speed change device, generally, the upper support 7. The cable goes from this fixed point to an articulated element of the speed change device in order to apply the tension force exerted by the cyclist for the deformation of the parallelogram and, by consequence, the transverse displacement in the direction of arrow F in the direction of the pinions of increasing diameter.

Most often, this force is poorly applied with respect to the desired transverse displacement F. The angle of the cable, and as a consequence the angle of application of the force with respect to the desired transverse displacement, is too large. Illustrated in FIG. 1 in the form of an angle $a$ between a base, notably the line X—X, which establishes the angle of the cable and the direction of application of the force in a speed change device of known type.

As a result, the control actions require more force, and are harder to apply, which does not facilitate the operations of speed change and the passage of the chain guide.

As appears also from the schematic drawing in FIGS. 1, 2 and 3, the length of the displacement of the cable 8 which is necessary for the transverse displacement of the chain guide 1 from one extreme position to the other, is translated by the difference of the dimensions L and L 1. This difference is reduced, so that it provides a limited angular displacement $\beta$ of the control lever 12 to pass the speeds while engaging the chains successively with the pinions. This reduced angular displacement adversely affects the cyclist with regard to the position sought and the placement in correct position of the lever for each speed.

Another significant disadvantage is found in the fact that, the transverse displacement of the chain guide 1 causes the angle of the cable and of application of the force to be constantly modified and irregular whereas there is produced a contact under great pressure of the cable in the sheath, notably at the outlet mouth of the sheath. This contact is a significant factor as regards wear and can have serious consequences.

It has been proposed to transversely displace the sheath stop and consequently the position of the cable, with respect to the articulated parallelogram. However, this transverse displacement is limited by reason of the proximity of the free wheel cluster, and one can only therefore correct very slightly, the unfavorable angle of the cable and the application of the control force. Furthermore, even with a movable abutment, the orientation thereof remains fixed and the friction forces of the cable under high pressure (with the risks flowing therefrom) are not eliminated. Furthermore, in the position of the alignment of the chain guide 1 with the pinion with smallest diameter of the free wheel cluster, the sheath orients itself towards the free wheel cluster thereby risking contact therewith.

SUMMARY OF THE INVENTION

The control apparatus according to the invention overcomes these disadvantages by substantially reducing the angle of application of the control force formed between the cable and the direction of transverse displacement of the chain guide. In a manner no less important, this apparatus increases the length of displacement of the cable necessary for the same useful transverse displacement of the chain guide. Thereby, the angular displacement of the control lever acted on by the cyclist is greater and there is much greater smoothness of operation with better possibility of finding the speeds.

The apparatus according to the invention is characterized in that the angle of the cable i.e. the angle of the application of the control force to deform the parallelogram and to transversely displace the chain guide is very substantially reduced by means providing a double offset of the point of departure of the cable in the direction of the exterior lever or other movable element of the parallelogram, this double offset being firstly laterally in the direction of the free wheel, cluster and secondly in the direction of the lower support.

BRIEF DESCRIPTION OF DRAWING

FIG. 7 is a side elevated view which shows a first embodiment of the apparatus according to the invention in which the upper fixed support of the speed change device has a lateral projection in the direction of the wheel which realizes a double offset the point of departure of the cable and more precisely of the sheath stop.

FIG. 8 is a front view showing the speed change device according to another embodiment of the apparatus for offset of the cable with its control lever.

FIG. 9 is a view taken in the direction of arrow A in FIG. 8 showing the bearing member and the offset of the cable.

DETAILED DESCRIPTION

As regards what has been stated above, the speed change device with articulated parallelogram is only one embodiment of the application of the apparatus according to the invention and it is understood that other types of speed change devices can receive the apparatus according to the invention.

Figure 1:
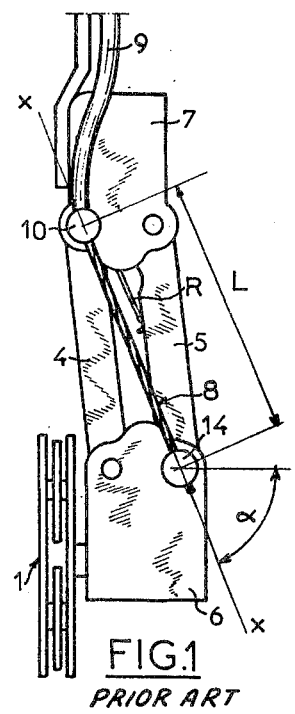
FIG. 1 and 2 schematically show a speed change device with a deformable parallelogram, with control apparatus of known type, in two extreme positions of traverse displacement of the chain guide.
Figure 3:
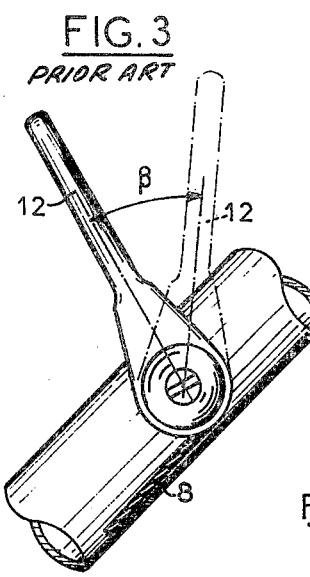
FIG. 3 shows the amplitude of angular displacement of the control lever in going from the position of FIG. 1 to the position of FIG. 2.
Figure 2:
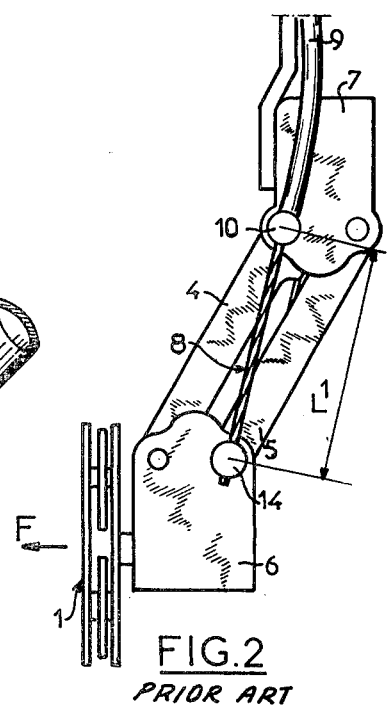
Figure 4:
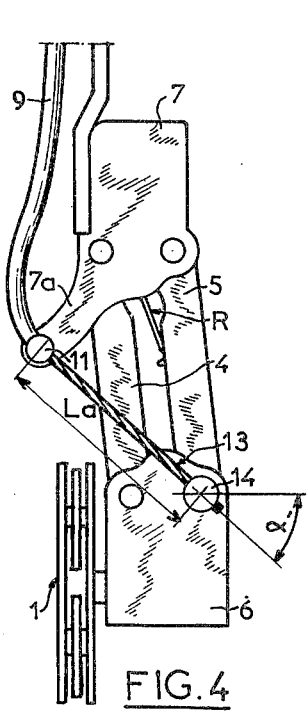
FIGS. 4 and 5 schematically show a speed change device with deformable parallelogram with control apparatus according to the invention in two extreme positions of transverse displacement of the chain guide.
Figure 6:
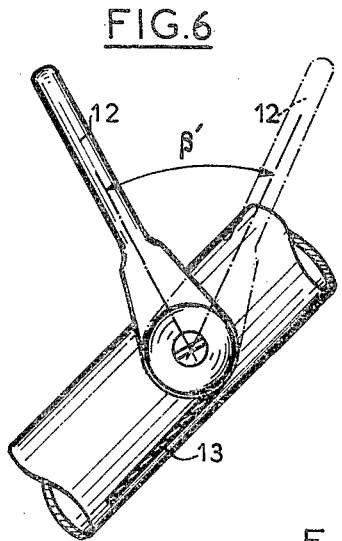
FIG. 6 illustrates the amplitude of the angular displacement of the control lever in going from the position of FIG. 4 to the position of FIG. 5.
Figure 5:
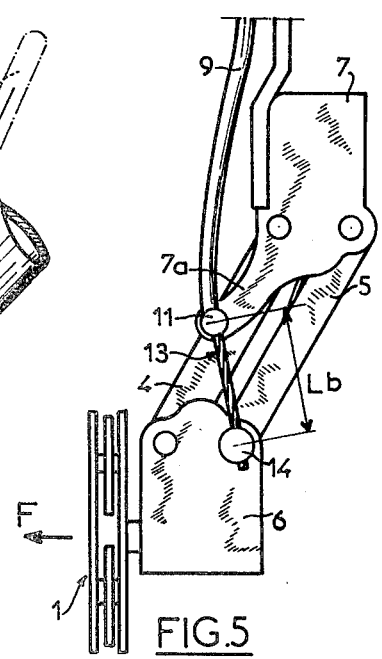

In FIGS. 4, 5 and 6 there is seen a first embodiment of the apparatus for offset of the control cable which is constituted by a projection 7a on the support 7 extending in the direction of the free wheel cluster 3 and at the end of which is mounted a sheath stop 11 traversed by a cable 13 which is connected to a cable attachment 14 on the lower support 6 it is noted that between the extreme positions of the chain guide (FIGS. 4 and 5) the magnitude of the difference between La and Lb, the sheath stop 11 and the cable attachment 14 is greater than the difference between stated L and $L^1$ in FIGS. 1 and 3; stated otherwise, the angular travel $\alpha^1$ (FIG. 6) of the control lever 12 is substantially greater than $\beta$ in FIG. 3 and thus makes easier the finding of the passage of the speeds. Similarly, due to the offset laterally and towards the base of the sheath stop, i.e. the point of application of the force, the angle $\alpha^1$ of application of this force is more acute as compared to the conventional control illustrated in FIG. 1 which permits a more efficient and rational traction of the chain guide 1.

This position of the point of application of the force realized according to FIGS. 4 and 5 can be adjusted towards the base and towards the free wheel cluster as shown in FIG. 7 where the projection 7a on the upper support is provided with an oblong slot 7b permitting adjustment of the position sheath stop 11 fixed in orientable or non-orientable position. The slot 7b is inclined in the direction of the free wheel cluster and the direction of the lower support and can be curvilinear or rectilinear.

Figure 11:
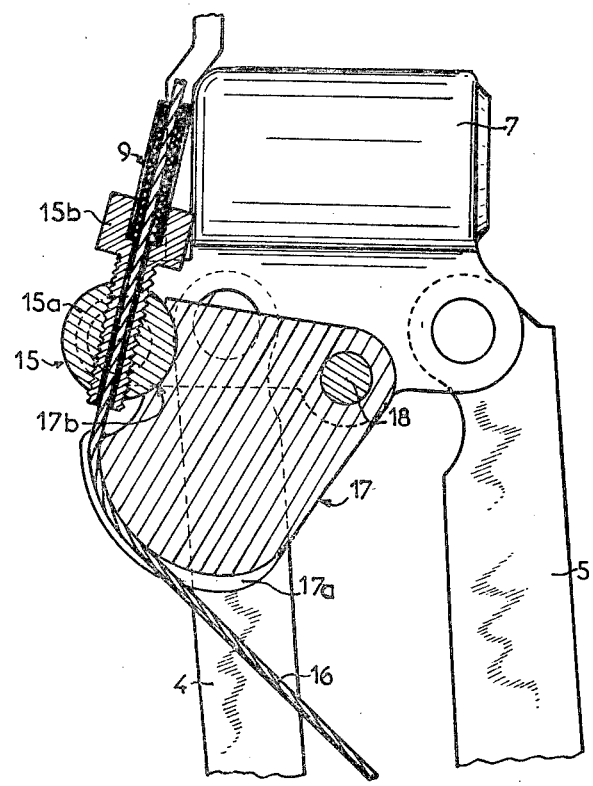
FIG. 11 is a sectional view on enlarged scale taken along line II—II in FIG. 8 showing the mounting of the bearing member and the offset of the cable.

According to another embodiment illustrated in FIGS. 8, 9, and 11, the sheath stop 15 comprises a shaft 15a threaded or rivetted to the upper support 7 and traversed by a hollow bolt 15b whose head receives the sheath 9 whereas the cable 16 traverses the sheath and the bolt 15b and is wound in a groove 17a formed in a member 17 of sector shape positioned to offset the cable on the side of the free wheel cluster before the cable descends for attachment either to the lower support 6 or in proximity to this support. It is not excluded in this embodiment for the sheath stop to be constructed in a different manner.

In the illustrated embodiment, the member 17 is independent of the upper support to which it is connected by a threaded or rivetted pin 18, the member 17 being maintained angularly in the position for offset of the cable passing in the groove 17a by bearing of a concave surface 17b against the shaft 15a of the sheath stop mounted orientably or not on the upper support 7.

The member 17 can be rather elongated in the direction of the lower support and the free wheel cluster in order to further diminish the angle $\alpha'$ (as shown in chain dotted lines in FIG. 9).

Figure 12:
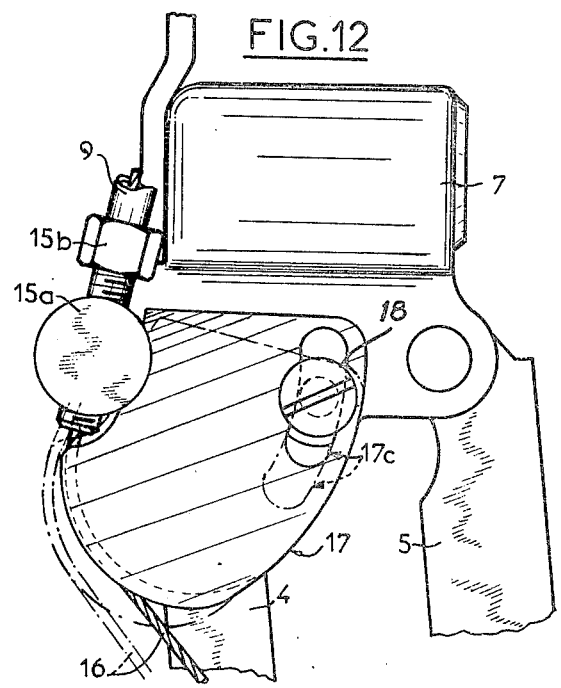
FIG. 12 is a view on enlarged scale of the bearing member and the offset of the cable according to a modified embodiment.
Figure 10:
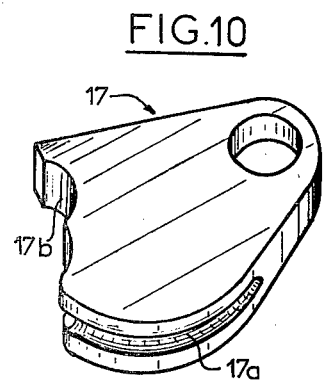
FIG. 10 is a perspective view of the bearing member for offset of the cable according to FIGS. 8 and 9.

In another embodiment illustrated in FIG. 12, the member 17 is adjustably mounted on the support 7 through an oblong curved slot 17c sliding by receiving the shaft 18 and whose radius has, as its center, the axis of the shaft 15a of the sheath stop which in this case is necessarily mounted movably on the upper support 7.

This arrangement permits the adjustment of the angular position of member 17, and therefore the offset laterally, and towards the base of the cable. There is thus modified, for the same useful displacement of the chain guide, the necessary travel of the cable and consequently the angular displacement of the lever. This permits the following advantages:

1. Adjustment and obtention of the maximum angular travel of the control lever as a function of the number of teeth of the free wheel cluster which facilitates finding the speeds.
2. The possibility of utilizing a lever with a much larger diameter of winding drum for the cable which leads to a much greater curvature and to a better support of the cable.

The member 17 is preferably made of a plastic material for example "Delrin". However, the member 17 can be made of a different material from the upper support.

It is not excluded that the member for offset laterally and towards the base of the point of application of the force can be realized from a one piece element integral with the upper support even if the sheath stop and the offset member are made from the same material or even if the upper support, the offset member and the sheath stop are made from the same material.

The following advantages are also emphasized

Substantial angular travel of the control lever facilitating the finding of the speeds.

Better application of the traction force on the chain guide by offset laterally and towards the base of the point of application of the force, permitting a more rational angle of application for the traction of the chain guide.

Low amplitude of self-alignment of the sheath towards the large teeth, as the point of bearing of the cable is always in contact on the profile of the support in the case of the offset member of sector shape.

The sheath at its location where it forms a loop is not displaced or is only slightly displaced either towards the exterior of the bicycle which avoids ultimate snagging or towards the interior so as not to be in contact with the chain or the free wheel cluster.

The invention is not limited only to the disclosed embodiments; and in contrast, it embraces all variations if defined by the ammended claims.

I claim:

1. Apparatus for the control by a cable of a speed change device comprising an articulated parallelogram including a fixed upper support, a laterally movable lower support, two parallel levers pivotably connected to said support, a chain guide secured to said lower support and laterally movable therewith for derailing a chain on pinions of a free wheel cluster, elastic means acting on the parallelogram to deform the same in one direction, the cable acting on the parallelogram to deform the same in the other direction against the action of the elastic means, means securing said cable to said parallelogram at first and second spaced locations such that application of external force to said cable produces deformation of said parallelogram, and projection means on said parallelogram, carrying said means for securing said cable at said first location, said projection means offsetting said first location both laterally in the direction of the free wheel cluster and vertically in the direction of the lower support to reduce the angle of the cable connected at said first and second locations with respect to the direction of lateral movement of the chain guide.

2. Apparatus as claimed in claim 1 wherein said projections means is on said upper fixed support.

3. Apparatus as claimed in claim 2 wherein said projection means comprises a projection member having a slot, said means for securing said cable at said first location comprising a sheath stop adjustably secured in said slot.

4. Apparatus as claimed in claim 3 wherein said means for securing said cable at said first location comprises a sheath stop secured to said upper support, said cable exiting from the sheath thereof at said sheath stop, said projection means comprising a projection member secured to said upper support and having a curved bearing surface receiving said cable to maintain the cable substantially axially in the sheath and direct the cable to said second location.

5. Apparatus as claimed in claim 4 wherein said bearing member and upper support are formed integrally from a one-piece body of plastic material.

6. Apparatus as claimed in claim 4 wherein said bearing member is made of a plastic material and is fixedly connected to said upper support.

7. Apparatus as claimed in claim 4 wherein said bearing member, sheath stop and upper support are formed integrally from a one-piece body of plastic material.

8. Apparatus as claimed in claim 4 wherein said bearing member has a curved portion provided with a groove receiving said cable, said curved portion being oriented to guide the cable in alignment with the sheath at said sheath stop.

9. Apparatus as claimed in claim 8 comprising a shaft fixed to said upper support, said bearing member being pivotably mounted on said shaft, said bearing member having a face bearing against said sheath stop to angularly secure said bearing member.

10. Apparatus as claimed in claim 9 wherein said upper support has a curved slot, slidably receiving said shaft, said curved slot having a center disposed on the axis of the sheath stop.

11. Apparatus as claimed in claim 10 wherein said sheath stop comprises a shaft secured to the upper support, said face of the bearing member which bears against the sheath stop being concave and resting against said shaft.

* * * * *